Oct. 2, 1962 R. E. OLIVER 3,056,209
METHOD AND APPARATUS FOR MEASURING SURFACE CONTOURS
Filed Jan. 4, 1960 3 Sheets-Sheet 1
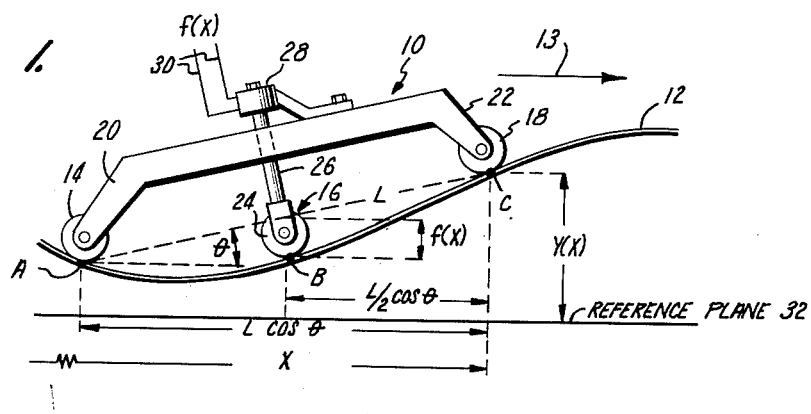
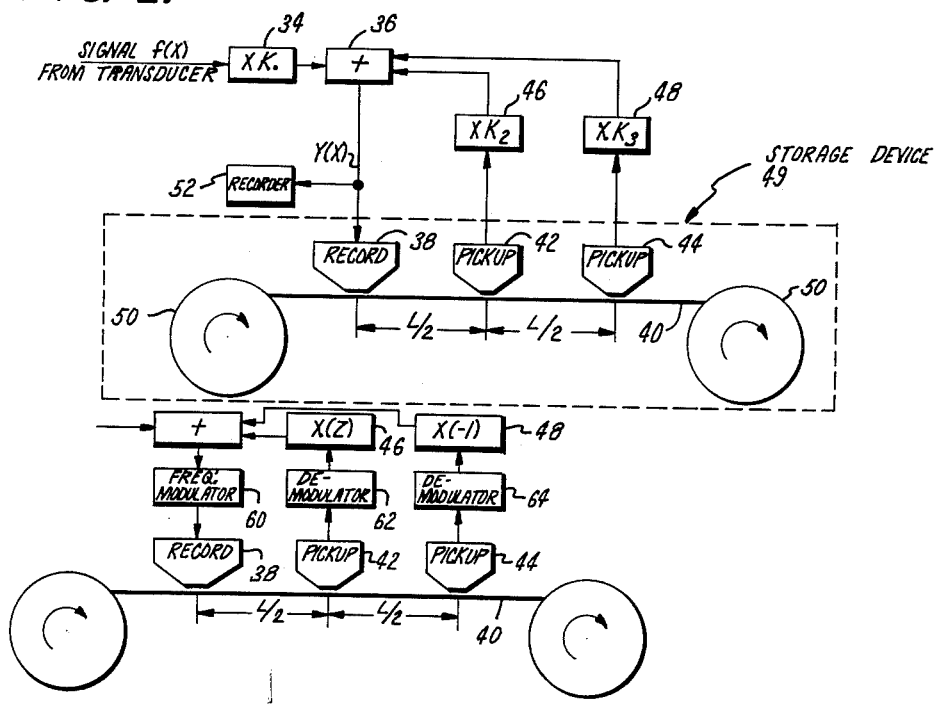
INVENTOR.
ROBERT E. OLIVER
BY
Christie, Parker & Hale
ATTORNEYS Oct. 2, 1962 R. E. OLIVER 3,056,209
METHOD AND APPARATUS FOR MEASURING SURFACE CONTOURS
Filed Jan. 4, 1960 3 Sheets-Sheet 2

ROBERT E. OLIVER
INVENTOR.

BY Christie, Parker & Hale
ATTORNEYS

Oct. 2, 1962 R. E. OLIVER 3,056,209
METHOD AND APPARATUS FOR MEASURING SURFACE CONTOURS
Filed Jan. 4, 1960 3 Sheets-Sheet 3
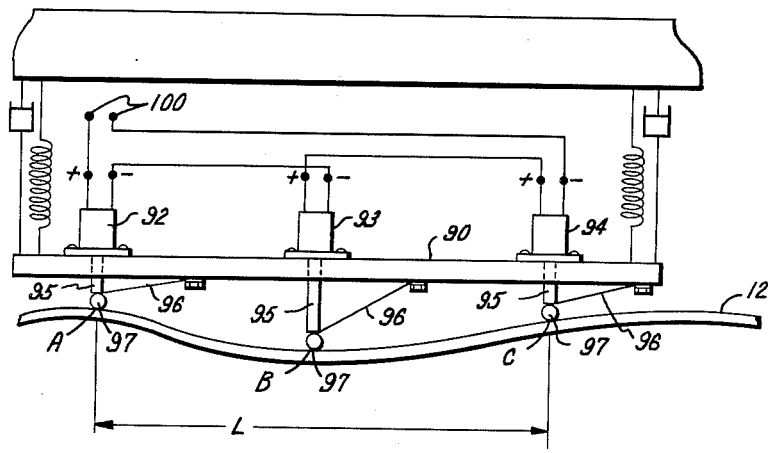
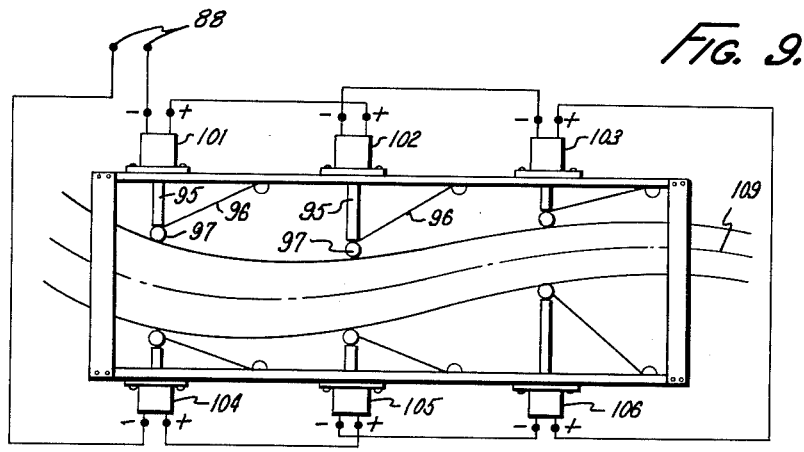
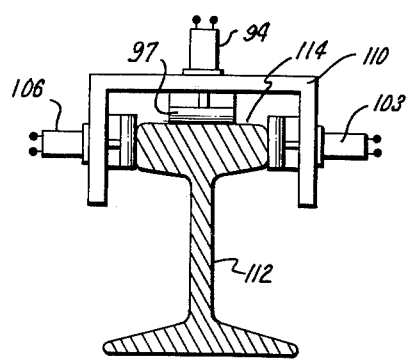
INVENTOR.
ROBERT E. OLIVER
BY
Christie, Parker & Hale
ATTORNEYS

United States Patent Office 3,056,209
Patented Oct. 2, 1962

3,056,209
METHOD AND APPARATUS FOR MEASURING SURFACE CONTOURS
Robert E. Oliver, Pasadena, Calif., assignor, by direct and mesne assignments, to Aeronautical Engineering Research, Inc., Pasadena, Calif., a corporation of California
Filed Jan. 4, 1960, Ser. No. 391
11 Claims. (Cl. 33—174)

The present invention relates to a method and apparatus for measuring contours and, more particularly, to such a method and apparatus for accurately measuring the contour of a surface with respect to a reference plane.

Conventional surveying methods and apparatus have long been used for measuring the contour of surfaces such as the ground. Such methods and apparatus measure the altitude of spaced points on the surface to determine the distance between these points and a reference plane. This information is often used to provide contour maps and the like. Such prior art methods and apparatus are, of course, limited in their ability to measure the exact contour of a surface because (1) considerable time is required to measure the altitude of each point, thus limiting the number of points that can be considered on any surface, and (2) such a method does not yield any information concerning the irregularities of the surface between the points.

Where these irregularities are of slight importance, conventional surveying techniques are satisfactory. However, in certain applications, it is necessary to know the contour of a surface with precision. For example, in testing high-speed missile or rocket components on the ground, it is often necessary to place such a component on a high speed sled which travels over a track or rail. To determine the performance of a component such as an engine, it is essential to know the reaction between the sled and the rail as the sled travels along the rail. This requires accurate knowledge of the contour of the rail. To employ ordinary surveying techniques for determining the contour of the surface of such a rail would require a very long time even without considering the problem of accuracy.

In accordance with my invention, I have provided a method and apparatus for measuring the continuous contour of a surface, such as the top surface of a rail, in a very short time and with a high degree of accuracy. In accordance with the present invention, the continuous contour of a surface with respect to a reference plane is obtained by moving first, second and third contour followers over the surface to continuously establish three spaced points along a line on the surface. The first, second and third contour followers may include separate wheels engaging the surface and are arranged to sense or establish a first (end) point, a second (intermediate) point and a third (end) point, respectively, on the surface at any given time. The first and second contour followers are arranged to sense points previously sensed by the third contour follower. The distance between the intermediate or second point and a line drawn between the end points is continuously measured and added to predetermined values of the distance between the reference plane and the first point and the distance between the reference plane and the second point to obtain a measure of the distance between the reference plane and the third point. Thus, the distance between the point on the surface sensed by the third contour follower and the reference plane is continuously obtained as the contour followers are moved over the surface. Data representative of this distance may be continuously recorded and read out at preselected time intervals to provide a measure of the distances between the reference plane and the first and second points.

The invention is explained in greater detail in accordance with the accompanying drawings in which:

FIG. 1 is a side elevation view of a carriage that may be utilized in the present invention;

FIG. 2 is a schematic circuit diagram of one embodiment of a computing device in accordance with the invention;

FIG. 3 is a modification of the computing device shown in FIG. 2;

FIG. 8 is a side elevation view of another embodiment of a carriage in accordance with the present invention;

FIG. 9 is a plan view of a further embodiment of a carriage of the present invention; and FIG. 10 is a front elevation view, partly in section, of a carriage for measuring the horizontal and vertical contour of the surface of a rail.

Figure 5:
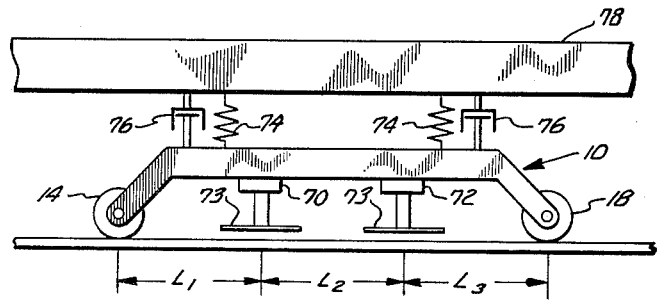
FIG. 5 is a side elevation view of another embodiment of a carriage in accordance with the present invention.

Referring now to the drawings and, more particularly, to FIG. 1, there is shown a carriage 10 adapted to be moved over a surface 12 in a direction indicated by the arrow 13. Three contour followers 14, 16 and 18 are carried by the carriage and arranged to sense three spaced points A, B and C, respectively, on the surface 12. The contour followers 14 and 18 are wheels rotatably mounted on downwardly extending legs 20 and 22 of the carriage 10. The contour follower 16 includes a wheel 24 rotatably mounted on a shaft 26 of a transducer 28. Shaft 26 of the transducer 28 is slideably mounted so that it is free to move in a direction perpendicular to the carriage 10 and is biased in a downward direction by a suitable spring (not shown) to engage the surface 12. Such transducers are well known in the art, and a detailed consideration thereof is not considered necessary here. Such a transducer can function by varying the reluctance, resistance or capacitance of a circuit. It is only necessary that the output signal of the transducer 28 be proportional to the distance between the point B and a line drawn between points A and C.

The computing device of FIG. 2 combines the output signal from the transducer 28 with signals representative of the distance between a reference plane 32 and the points A and B, to obtain a measure of the distance between the reference plane and point C, as will be explained.

Before describing the computing device of FIG. 2 and its operation, it may be helpful to briefly consider several trigonometric equations. For example, the distance between the point C and the reference plane 32 in FIG. 1 is defined by the following equation:

(1) $\quad Y(X) = Y(X - L \cos \theta) + L \sin \theta$ where: $Y(X)$ = the distance between the reference plane 32 and the point C.
$X$ = the independent variable of horizontal distance along the reference plane 32.
$L$ = the distance between the points A and C.
$\theta$ = the angle between the line drawn between points A and C and the reference plane 32.
$Y(X - L \cos \theta)$ = the distance between the reference plane 32 and the point A.

The quantity sin θ is defined by the following equation:

(2)
$$\sin \theta = \frac{2}{L}[Y(X-L/2 \cos \theta) + f(X) - Y(X-L \cos \theta)]$$

where: $Y(X-L/2 \cos \theta)$ = the distance between the reference plane 32 and the point B.
$f(X)$ = the distance between the point B and the line drawn between points A and C.

Substituting Equation (2) into Equation (1) results in:

(3) $Y(X) = 2Y(X-L/2 \cos \theta) - Y(X-L \cos \theta) + 2f(X)$

The maximum absolute value of the angle θ can be made very small by increasing the length L, that is, the distance between the contour followers 14 and 18. Where the surface to be measured is substantially flat and where the irregularities to be measured are small in wave length compared to the distance L, cos θ will differ from unity or 1 by a very small amount; for example, less than .001%. Substituting the value 1 for cos θ, Equation 3 yields:

(4) $Y(X) = 2Y(X-L/2) - Y(X-L) + 2f(X)$

Thus, Y(X) or the distance between point C and the reference plane 32, is equal to the sum of twice the distance between the reference plane and point B, minus the distance between the reference plane and point A, plus twice the distance between the point B and a line drawn between points A and C. It should be noted that the signal derived from the transducer 28 is proportional to $f(X)$ times cos θ. However, where cos θ is substantially equal to 1, the signal from the transducer 28 may be considered to be $f(X)$.

To solve Equation 4, the computing device disclosed in FIG. 2 may be utilized. The output from the transducer 28 or $f(X)$ is fed to an electronic multiplier 34 which multiplies the signal $f(X)$ by a first predetermined value, K1, which may be 2. Such an electronic multiplier may be a conventional amplifier with a constant and predetermined gain. The output of the multiplier 34 is fed to one input of a summing circuit 36. The output of the summing circuit 36 is fed to a record head 38 of a storage device 49 which records the output signal on a magnetic tape 40. The storage device includes two pickup heads 42 and 44 which are also coupled to the tape at spaced points from the record head 38 to pick up the recorded signal at predetermined times. The distance between the record head 38 and the pickup heads 42 and 44 must correspond to the distance between the contour followers 14, 16, 18, as will be more fully explained. For simplicity, the distance between the pickup head 42 and the record head 38 may be equal to L/2, i.e., the same distance as between the contour followers 14 and 16. In this instance, the distance between the pickup heads 42 and 44 will also be L/2. The output signals from the pickup heads 42 and 44 are fed to multipliers 46 and 48, respectively, which are coupled to respective inputs of the summing circuit 36. The multipliers 46 and 48 are arranged to multiply the signals derived from pickup heads 42 and 44 by second and third predetermined values or K2 and K3, respectively.

In operation, the carriage 10 is moved over the surface 12 at a predetermined speed. The signals from the transducer 28 are continuously fed to the electronic multiplier 34 and then to the summing circuit 36. The tape 40 is moved by means of reels 50 at a speed which is equal to the velocity of the carriage 10. Assume that the carriage 10 has moved one complete length so that the contour follower 14 is presently sensing a point that was previously sensed by the contour follower 18. As will be explained, the output signal from the pickup head 44 is representative of the distance between point A and reference plane 32. By the same token, the output of pickup head 42 is representative of the distance between point B and the reference plane.

The output signal from pickup head 44 is multiplied by K3 (i.e. −1) in the multiplier 48 and fed to one input of the summing circuit 36. The output of the pickup head 42 is multiplied by K2 (i.e. 2) in the multiplier 46 and fed to a third input of the summing circuit 36. Thus, the summing circuit 36 adds three signals: one signal proportional to twice the distance between the reference plane and point B, another signal proportional to twice the distance between the point B and the line connecting points A and C, and the third signal being proportional to minus the distance between the reference plane and point A. The addition of these three signals will provide an output signal from the summing circuit 36 which is proportional to the distance between the reference plane and the point C or Y(X), as is illustrated by Equation 4. Thus, as the carriage 10 moves along surface 12, a continuous signal proportional to the distance between the reference plane and the point being sensed by the contour follower 18 is recorded on the tape 40. This recorded signal is read out by the pickup heads 42 and 44 to provide signals representative of the distances between the reference plane 32 and the points B and A, respectively. If desired, an additional recorder 52, e.g., a pen-type recorder, may be connected to the output of the summing circuit for permanently recording in visually perceptive form the signal proportional to Y(X).

As mentioned previously, it is not necessary that the distance between the record and pickup heads be the same as the distances between the contour followers. The distance between the contour followers may be several feet, and the distances between the record and pickup heads a few inches or less. The distances between the record head and the pickup heads must, of course, be proportional to the distances between the contour followers, and the tape speed must be correlated with the carriage speed so that the pickup heads 42 and 44 are reading out signals representative of the distance between the reference plane and the points sensed by the contour followers 14 and 16, respectively.

It should also be noted that the storage device 49 may be any type of temporary or permanent storage facility. For example, a magnetic drum could be employed instead of the tape 40. It is only essential that the storage device be capable of reading out previously stored signals at predetermined times to provide the correct input signals to the summing circuit 36.

For the embodiment of the device described heretofore, it is required that the precise contour at the beginning of the track or surface for a distance equal to L be known and recorded (i.e., on tape 40) prior to the operation of the computer. This is easy to accomplish by accurately grinding or shaping the surface so that it is parallel with the reference plane for this initial distance L. In this case, the signals recorded on the tape 40 for the initial distance L will be zero.

The above-described requirement, that the initial portion (of length L) of the contour be known and recorded (i.e., on tape 40) prior to the operation of the computer, can be eliminated in view of the frequency limitations imposed by stability considerations, which will be described later. Since only certain ranges of frequencies or wave lengths of irregularities can be detected with accuracy for any particular configuration (i.e., spacings between the transducer and the contour followers) of this device, one skilled in the art can easily connect the output from the summing circuit 36 to a resistance-capacitance circuit which has a characteristic decay time much longer than the period of the lowest frequency $f_1$ which can be accurately recorded. By this means, the memory of the recording device is limited, and after a sufficiently long period of time (e.g., five times the period of the lowest frequency $f_1$ which can be recorded accurately) after starting the operation of the computer, the recorded signal will become virtually independent of the initially recorded signal.

Referring now to FIG. 3, there is shown a modification of the computing device of FIG. 2 in which a frequency modulator 60 is connected between the output of the summing circuit 36 and the record head 38. Two demodulators 62 and 64 are connected between the respective pickup heads and the multipliers 46 and 48. Such modulation and demodulation techniques are necessary where the transducer 28 produces a direct current signal and where the irregularities to be measured have a relatively long wave length which results in very low frequency output signals (i.e., less than 30 c.p.s.) from the transducer and the summing circuit.

In using the apparatus of FIGS. 1 and 2, it may be necessary to consider certain stability problems. Consideration of only Equation 4 would indicate that the multiplying factors K1, K2 and K3 should be 2, 2 and —1, respectively. However, these factors may not produce a stable system because of the accumulation of undamped noise signals. For example, consider a noise signal read out of the tape by the pickup head 42. This noise signal will be multiplied by 2 and then recorded. When the original noise signal reaches the pickup head 44, the amplified noise signal will again reach the pickup head 42. This results in a net noise signal of three times the original amplitude being applied to the inputs of the summing circuit 36. This process will, of course, be continuous until the tape is saturated. For this reason, it may be necessary to utilize different values for K2 and K3 to damp out oscillations caused by noise signals. The value of K1 may be arbitrary since it only determines the relationship between the amplitude of the output signal from the transducer 28 and the amplitude of the signal recorded on the tape 40. The following values of K2 and K3 have been found satisfactory to provide a stable system that accurately measures the contour of a surface:

| K2 | K3 | K2 | K3 |
| --- | --- | --- | --- |
| +1.571 | —0.715 | +1.600 | —0.667 |
| +1.500 | —0.625 | +1.530 | —0.589 |
| +1.444 | —0.556 | +1.613 | —0.646 |
| +1.692 | —0.769 | | |

Figure 4:
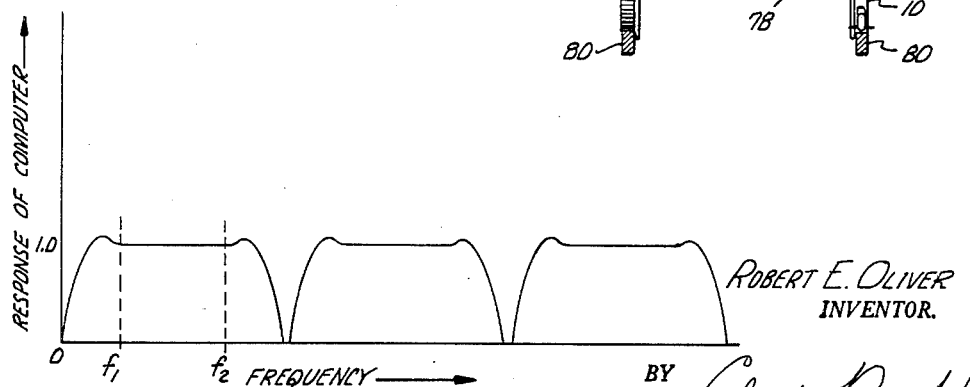
FIG. 4 is a graph illustrating the frequency response of the computing devices shown in FIG. 2 and FIG. 3.

By using appropriate values for K2 and K3, the system can be made stable and provide an accurate measurement of the contour of a surface. However, each pair of values for K2 and K3 that provide a stable system also result in a computer response curve such as shown in FIG. 4, wherein the abscissa represents the frequency of the recorded signals or wave length of the irregularities on the surface, and the ordinate represents the gain or response of the computer of FIGS. 2 or 3. As shown in FIG. 4, the response of the computer is constant only for a predetermined range of frequencies, e.g., for the range of frequencies from $f_1$ to $f_2$. By a suitable choice of the values for K2 and K3, the system may have a useful frequency range of 10:1 or, say, from 3 to 30 cycles. This response curve is repetitive, as shown in FIG. 4, leaving certain frequencies or wave lengths that cannot be detected with accuracy. However, this is no serious problem for most surface contours since only a limited range of frequencies or wave lengths of irregularities is of prime interest.

If desired, an arrangement such as shown in FIG. 5 may be used, wherein two transducers 70 and 72 are secured to the carriage and utilized to feed data to two separate computing devices. In this case, the distance between the transducers and the contour followers 14 and 18 will be different, to provide two separate measurements that have different frequency response characteristics such that their response characteristics overlap.

In the embodiment shown in FIG. 5, capacitive type transducers are illustrated. When capacitive type transducers are utilized as contour followers, it is not necessary that the contour followers actually engage the surface. The capacitive type transducer merely measures the capacitance between a plate 73 and a conductive surface such as an iron rail to give a measurement of the distance between the plate and a point on the adjacent surface. In the embodiment in FIG. 5, the carriage 10 is secured to a platform 78 by means of a spring 74 and dash pots or shock absorbers 76.

Figure 6:
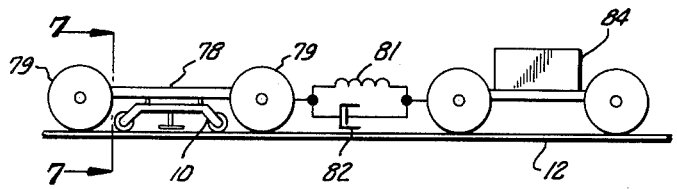
FIG. 6 is a side elevation view of an apparatus for moving the carriage along a rail or track.
Figure 7:
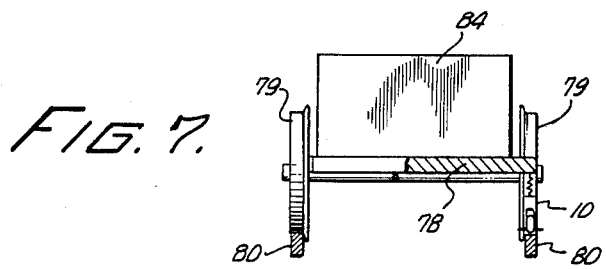
FIG. 7 is a view taken along lines 7—7 of FIG. 6.

One manner in which the carriage may be moved over the surface of a rail is shown in FIGS. 6 and 7, wherein the platform 78 is illustrated as being mounted between wheels 79 which ride on the rails 80. The platform 78 may be coupled to a suitable driving means such as a locomotive 84 by means of a spring 81 and shock absorber 82.

The carriage 10 may be moved over a surface at relatively high speeds (10 to 20 miles per hour or even faster) so that a relatively long length of surface may be covered in a short time. Where it is desired to measure several lines along a surface simultaneously, several carriages may be mounted on a platform, such as platform 78, and the entire platform moved over a surface by means of a locomotive. This may be desirable when measuring the surface contour of landing fields for aircraft and the like.

In FIG. 8, there is illustrated another embodiment of a carriage and a transducer arrangement. In this figure there is shown a carriage 90 which carries three transducers 92, 93 and 94. Each of the transducers has a slideably mounted shaft 95 which is free to move in a direction perpendicular to the carriage 90. The shaft 95 is biased in a downward direction by means of a spring 96 and carries at its lower end a rotatably mounted wheel 97 or other device for engaging the surface 12. By connecting the outputs of transducers 92, 93 and 94 in series as shown, the net output signal at the terminals 100 will be proportional to $f(X)$ or the distance between point B and a line drawn between points A and C.

In FIG. 9, there is illustrated a carriage arrangement for measuring the contour of the vertical centerline of a rail or the like. In this embodiment, six transducers 101–106 are secured to the carriage, each having a shaft 95, a surface engaging member 97 and a spring 96. The outputs of the transducers 101–106 are again connected in series to a pair of output terminals 108, across which a signal will be developed that is proportional to the deviations of the vertical centerline 109.

In FIG. 10, a front view of carriage 110 riding on a rail 112 is illustrated for simultaneously measuring deviations of the horizontal surface 114 of the rail and deviations of the vertical centerline as described with regard to FIG. 9. The carriage 110 includes three contour followers, as shown in FIG. 8, for sensing the horizontal surface 114, and six contour followers, as shown in FIG. 9, for sensing the sides of the rail 112.

Many variations of the method and apparatus for measuring surface contours as disclosed above will be obvious to those skilled in the art. For example, the carriage arrangement of FIG. 1 may be employed to measure surface contours where the angle $\theta$ is large and consequently, cos $\theta$ is not substantially equal to unity. To measure such surface contours, it is only necessary to measure the angle $\theta$ by suitable means.

The transducers mounted on the carriage may produce an alternating or direct current output signal. Also, the output signal $f(X)$ from the transducer or transducers carried by the carriage may be recorded (i.e., on tape) while the carriage is moving over the surface and utilized at a later time as the input to the computer of FIG. 2 or 3. In this case, the computing time may be considerably less than the time required for the carriage to travel over the surface.

It should also be noted that the distance between the contour followers (i.e., 14, 16 and 18 in FIG. 1) does not have to be equal. For example, the distance between the contour followers 14 and 16 may be any desired portion of the distance (L) between the followers 14 and 18.

What is claimed is:

1. In an apparatus for measuring the approximate contour of a surface with respect to a reference plane, the combination which comprises a carriage adapted to be moved over the surface, at least three contour followers carried by the carriage for sensing first, second and third spaced points on the surface when the carriage is in a given position, the contour followers being arranged so that first, second and third spaced points are in a plane substantially perpendicular to the reference plane with the second point being located between the first and third points, means coupled to at least one of the contour followers for producing a first signal proportional to the distance between the second point and a line drawn between the first and third points means for producing signals proportional to the differences between the reference plane and the first and second points, respectively, and means for combining the first signal with signals proportional to the distances between the reference plane and the first and second points to obtain a measure of the distance between the third point and the reference plane.

2. In an apparatus for measuring the approximate contour of a surface with respect to a reference plane, the combination which comprises a carriage adapted to be moved over the surface, at least three contour followers carried by the carriage and arranged to sense three spaced points on the surface in a plane substantially perpendicular to the reference plane, means for obtaining a first signal proportional to the distance between the intermediate point and the reference plane, means for obtaining a second signal proportional to the distance between one of the end points and the reference plane, means for obtaining a third signal proportional to the distance between the intermediate point and a line drawn between the end points, and means for combining the first, second and third signals to obtain a measure of the distance between the other end point and the reference plane.

3. In an apparatus of the class described, the combination which comprises a carriage adapted to be moved over a surface, at least three contour followers carried by the carriage and arranged to sense first, second and third consecutive spaced points on the surface, the loci of the points being in a plane substantially perpendicular to the surface, means for obtaining a first measure of the approximate distance between the second point and a line drawn between the first and third points, means for obtaining a measure of the approximate distance between the reference plane and the first point, means for obtaining a measure of the approximate distance between the reference plane and the second point means for adding a predetermined value of said first measure with predetermined values of a measure of the distance between the reference plane and the first and second points to obtain a measure of the distance between the reference plane and the third point and means for recording the last named measure.

4. In an apparatus for measuring the approximate contour of a surface with respect to a reference plane, the combination which comprises a carriage adapted to be moved over the surface, first, second and third contour followers carried by the carriage and arranged to sense the first, second and third spaced points on the surface, respectively, the first, second and third points lying in a plane substantially perpendicular to the reference plane, means for obtaining a first signal proportional to the distance between the first point and the reference plane, means for obtaining a second signal proportional to the distance between the second point and the reference plane, means coupled to at least the second contour follower for obtaining a third signal proportional to the distance between the second point and a line drawn between the first and third points, means for combining the first, second and third signals to obtain a fourth signal proportional to the distance between the third point of the reference plane, and means for recording the fourth signal.

5. In an apparatus of the class described, the combination which comprises a carriage adapted to be moved over a surface, at least three contour followers carried by the carriage and arranged to sense first, second and third consecutive spaced points on the surface when the carriage is in a given position, the loci of the points being in a plane substantially perpendicular to the surface, means for continuously obtaining a first signal proportional to the distance between the second point and a line drawn between the first and third points, means for obtaining second and third signals proportional to the distances between the reference plane and the first and second points, respectively, means for combining the last named signal with second and third signals proportional to the distance between the reference plane and the first and second points respectively to obtain a fourth signal proportional to the distance between the third point and the reference plane, a storage device coupled to the last named means for continuously storing the fourth signal and for reading out the recorded signals as the carriage moves to obtain the second and third signals.

6. In an apparatus for measuring the approximate contour of a surface with respect to a reference plane, the combination which comprises a carriage adapted to be moved over the surface, first, second and third contour followers carried by the carriage and arranged to sense first, second and third consecutive spaced points on the surface, respectively, when the carriage is in one position, the first, second and third points lying in a plane substantially perpendicular to the reference plane, transducer means coupled to at least the second contour follower for obtaining a first signal proportional to the distance between the second point and the line drawn between the first and third points, means including a storage device for obtaining second and third signals proportional to the distance between the reference plane and the first and second points respectively, means for combining the first, second and third signals to obtain a fourth signal proportional to the distance between the third point and the reference plane and means for recording the fourth signal in the storage device whereby the fourth signal may be read out of the storage device when the carriage has been moved so that the first or second contour followers sense the third point on the surface.

7. In an apparatus for measuring the approximate contour of a surface with respect to a reference plane, the combination which comprises a carriage adapted to be moved over the surface, at least three contour followers carried by the carriage and arranged to sense three spaced points on the surface in a plane substantially perpendicular to the reference plane, a transducer coupled to at least one of the contour followers for producing a signal representative of the distance between the intermediate point and a line drawn between the two end points sensed by the contour followers, a recording medium, at least one record head and two pickup heads coupled to the recording medium in a predetermined spaced relationship whereby the pickup heads will read out the signals recorded by the record head when the recording medium is moved relative to the record and pickup heads, adding means including at least three input circuits and one output circuit, means connected between the transducer and one of the input circuits of the adding means for multiplying the output of the transducer by a first predetermined value, means coupled individually between the other input circuits of the adding means and each of the pickup heads for multiplying the signals developed in the pickup heads by second and third predetermined values and means connecting the output circuit of the adding means to the record head.

8. An apparatus for measuring the approximate contour of a surface with respect to a reference plane comprising a carriage adapted to be moved over the surface in a given direction at a predetermined speed, at least first, second and third contour followers carried by the carriage for sensing first, second and third consecutive spaced points on the surface, respectively, the points being aligned with the direction of the carriage travel so that the first and second points follow the third point, transducer means including at least the second contour follower for producing an output signal proportional to the distance between the second point and a line drawn between the first and third points, a recording medium, a record head and first and second pickup heads coupled to the recording medium, the first and second pickup heads being spaced with respect to the record head in the same relationship that the points established by the first and second contour followers are spaced from the point sensed by the third contour follower, a summing circuit including three input circuits and one output circuit, means for the coupling the output signal of the transducer means to one input circuit of the summing circuit, means coupled individually between the other two input circuits of the summing circuit and the first and second pickup heads for multiplying the output signal from the first and second pickup heads by first and second predetermined values, respectively, and means connecting the output of the summing circuit to the record head and means for moving the recording medium with respect to the record and pickup heads at a preselected velocity so that the first and second pickup heads read out signals previously recorded by the record head when the third contour follower sensed the points being sensed by the first and second contour followers, respectively, the first and second predetermined values being arranged to provide an output signal from the summing circuit that is proportional to the distance between the point sensed by the third contour follower and the reference plane.

9. In an apparatus for measuring the approximate contour of a surface with respect to a reference plane, the combination which comprises a carriage, means for moving the carriage over the surface, first, second and third contour followers connected to the carriage and arranged to sense first, second and third consecutive spaced points on the surface, respectively, when the carriage is in any given position, the contour followers being further arranged so that the loci of the first, second and third points lie in a plane substantially perpendicular to the reference plane, means including the second contour follower for producing an output signal proportional to the distance between the second point and a line drawn between the first and third points, a summing circuit having an output and first, second and third inputs, means for applying a predetermined value of the output signal to the first input of the summing circuit, first and second multiplier circuits, each of the multiplier circuits having an input and an output and being arranged to produce a signal at the output thereof that is a predetermined value of the signal applied to the input thereof, means for connecting the outputs of the first and second multiplier circuits to the second and third inputs of the summing circuit, respectively, and delay means coupled individually between the output of the summing circuit and the inputs of the first and second multiplier circuits.

10. The combination defined in claim 9 wherein the delay means includes a recording medium, a record head coupled between the recording medium and the output of the summing circuit, a first pickup head coupled between the recording medium and the input of the first multiplier circuit, a second pickup head coupled between the recording medium and the input of the second multiplier circuit and means for moving the recording medium relative to the record and pickup heads.

11. The combination defined in claim 10 wherein the first and third contour followers comprise wheels rotatably mounted on the carriage and the second contour follower comprises a capacitance type transducer.

References Cited in the file of this patent

UNITED STATES PATENTS 1,633,841   Andrew _____ June 28, 1927